(12) United States Patent
Garcia, Jr. et al.

(10) Patent No.: US 7,152,828 B1
(45) Date of Patent: Dec. 26, 2006

(54) METHOD AND APPARATUS FOR THE HOOKUP OF UNMANNED/MANNED ("HUM") MULTI PURPOSE VEHICLES WITH EACH OTHER

(75) Inventors: Frank Garcia, Jr., Walnut, CA (US); John L. Junkins, College Station, TX (US); John L. Valasek, College Station, TX (US)

(73) Assignee: Sargent Fletcher, Inc., El Monte, CA (US)

( * ) Notice: Subject to any disclaimer, the term of this patent is extended or adjusted under 35 U.S.C. 154(b) by 427 days.

(21) Appl. No.: 10/701,209

(22) Filed: Nov. 1, 2003

Related U.S. Application Data

(60) Provisional application No. 60/423,178, filed on Nov. 1, 2002.

(51) Int. Cl.
*B64D 39/00* (2006.01)

(52) U.S. Cl. .................................................. 244/135 A
(58) Field of Classification Search ............ 244/135 A, 244/135 R, 172.4; 701/3, 189, 190
See application file for complete search history.

(56) References Cited

U.S. PATENT DOCUMENTS

| | | | |
|---|---|---|---|
| 2,946,543 A | | 7/1960 | Gordon et al. |
| 3,091,419 A | * | 5/1963 | Mosher ................... 244/135 A |
| 3,268,091 A | * | 8/1966 | Melton ..................... 244/172.4 |
| 4,129,270 A | * | 12/1978 | Robinson et al. ........ 244/135 A |
| 4,177,964 A | * | 12/1979 | Hujsak et al. ............ 244/172.4 |
| 5,326,052 A | | 7/1994 | Krispin et al. |
| 5,530,650 A | | 6/1996 | Biferno et al. |
| 5,906,336 A | | 5/1999 | Eckstein |
| 6,254,035 B1 | * | 7/2001 | Howard et al. .......... 244/172.4 |
| 6,266,142 B1 | | 7/2001 | Junkins et al. |
| 6,324,295 B1 | | 11/2001 | Valery et al. |
| 6,464,173 B1 | | 10/2002 | Bandak |
| 6,819,982 B1 | * | 11/2004 | Doane ............................ 701/3 |
| 6,889,941 B1 | * | 5/2005 | McElreath et al. ...... 244/135 A |
| 6,960,750 B1 | * | 11/2005 | Doane .................... 244/135 A |
| 6,966,525 B1 | * | 11/2005 | Schroeder ............... 244/135 A |

OTHER PUBLICATIONS

Eric N. Enig, Autonomous Aerial Refueling of UAVs/UCAVs journal, 2002, ARSAG '02, UAV Refueling, Inc., MD, USA.

* cited by examiner

*Primary Examiner*—Galen Barefoot
(74) *Attorney, Agent, or Firm*—Edward A. Sokolski

(57) ABSTRACT

A system for the hookup of either a manned or unmanned vehicle with a second vehicle which may be refueling. These vehicles may be both airborne, one airborne and the other on the ground or both on the ground. A probe extending from a first vehicle which may be refueled is joined to a paradrogue or "flycatcher" at the end of a boom on a second vehicle which may be a refueling vehicle. In bringing the probe into the paradrogue an optical sensor on one of the vehicles is employed in conjunction with optical beacons on the other vehicle with the sensor measuring the relative motion between the probe and the paradrogue and generating a control signal for controlling motion of the probe relative to the paradrogue. The positioning of the probe relative to the paradrogue is accurately controlled during the fueling operation by a reeled cable mechanism utilizing a reel which is driven to wind one end of the cable there around to retain the cable in a tensioned state. The other end of the cable is attached to the refueling vehicle . . . The cable, probe and the refueling vehicle are in a triangular configuration while allowing only small interaction forces restrains relative motion between the probe and the paradrogue.

7 Claims, 5 Drawing Sheets

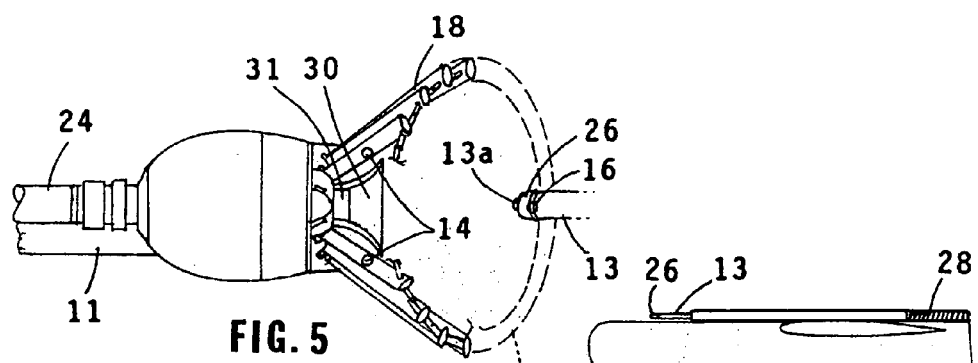
FIG. 5
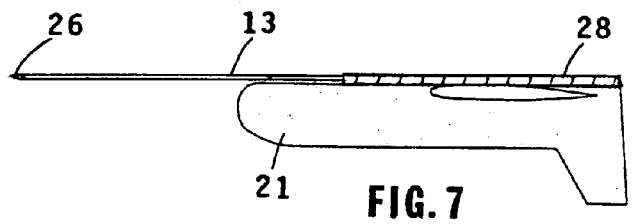
FIG. 6
FIG. 7
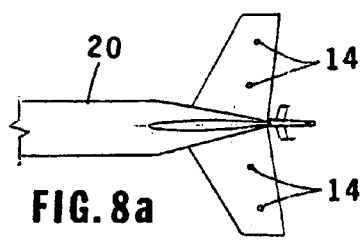
FIG. 8a
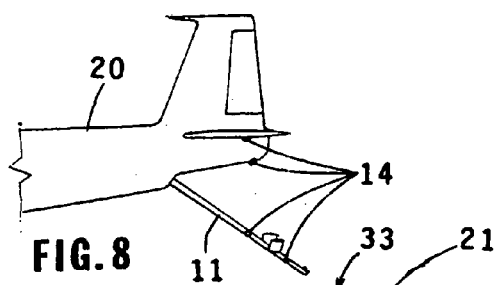
FIG. 8
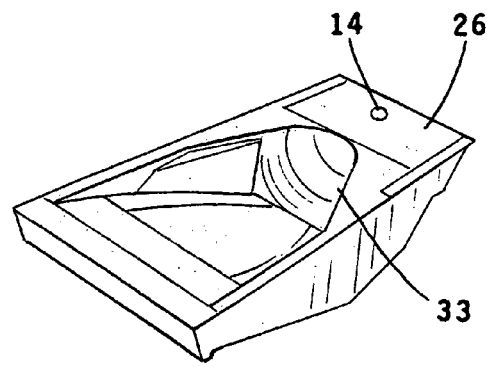
FIG. 8b
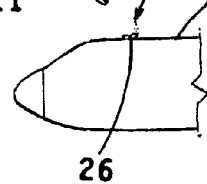

METHOD AND APPARATUS FOR THE HOOKUP OF UNMANNED/MANNED ("HUM") MULTI PURPOSE VEHICLES WITH EACH OTHER

This application is based on Provisional Application No. 60/423,178 filed Nov. 1, 2002.

BACKGROUND OF THE INVENTION

1. Field of the Invention

This invention relates to the hookup between multipurpose vehicles which may be either manned or unmanned and more particularly to such a hookup which may be but not necessarily for the purpose of refueling one of said air vehicles from the other.

2. Description of the Related Art

The capability of continuous operation of autonomous air vehicles ("UAVs") is limited by their onboard fuel capacity. The desired capability for continuous operation 24 hours a day every day of the week of such air vehicles, which are limited by their fixed onboard fuel capacity raises a need to routinely air-refuel these vehicles. This in turn gives rise to the need for integrating a high precision navigation technology with an appropriately designed aerial refueling system which is compatible with the navigation system . . . A typical airborne refueling system is described in U.S. Pat. No. 5,326,052 issued Jul. 5, 1994 to Krispin et al. Such systems often employ hose and drogue connections between the fueling aircraft and the aircraft being fueled. To connect the hose to the drogue requires a control system such as described in U.S. Pat. No. 6,266,142 issued Jul. 24, 2001 to Junkins, et al., U.S. Pat. No. 5,326,052 issued Jul. 5, 1994 to Krispin et al., and U.S. Pat. No. 5,530,650 issued Jun. 25, 1996 to Biferno, et al.

The joining of two vehicles together far various purposes such as the joining of a manned aircraft with an unmanned aircraft for refueling requires a precision navigation system which is integrated with the refueling system. Prior art systems have shortcomings in that they fail to provide the combination of a precision navigation system with a precision refueling system with the accuracy and reliability to be desired. These shortcomings lie particularly in the design of the probe on the aircraft being refueled and the drogue on the refueling aircraft where the coupling between these elements and the reliable and firm retention of these two units to each other is essential for proper operation. In addition, when the probe is being brought into contact with the drogue, it is important that there be good control of the movement of the probe so that it does not improperly strike against either aircraft.

SUMMARY OF THE INVENTION

The present invention employs a system for joining two vehicles together have a boom which includes a paradrogue or docking captive device on one of the vehicles and having a modified drogue or probe with beacons mounted thereon which is joined with a newly designed probe on the other vehicle, the probe having a sensor which communicates with the beacons.

In a preferred embodiment, an optical sensor system known as VisNav operating in conjunction with the optical beacons measures the relative motion between a refueling probe and the drogue attached to the boom on a refueling aircraft. These measurements include relative position, velocity, acceleration, attitude, etc and the measurement of the relative motion of the universal aerial refuel receptacle slipway installation (UARRS) relative to the refueling probe of the vehicle being refueled. Such a system is shown in FIGS. 1 and 2 and is described in U.S. Pat. No. 6,266,142 issued Jul. 24, 2001 to Junkins et al., particularly in connection with FIG. 18 of this patent. In the present invention, this prior art system is combined with a highly accurate control system for controlling the positioning of the boom (and drogue) relative to the probe and the probe's entry therein. In addition, the positioning of the probe within the drogue is accurately controlled during the refueling operation so as to restrain relative motion between the probe and drogue with small interaction forces. This operation is enhanced by the use of a reeled cable mechanism which runs between a reel on the aircraft and a compliant joint on the boom to form a triangular configuration with the boom and aircraft body. The reel mechanism is tensioned to take up any slack in the support of the boom. The compliant joint, together with the triangular arrangement formed with the cable, has small interaction forces yet restrains relative motion between the boom and the drogue during refueling operations.

It is therefore an object of this invention to provide an improved aircraft refueling system particularly suited for refueling unmanned airborne vehicles;

It is a further object of this invention to improve the control of the motion between two vehicles that are being connected to each other;

It is still a further object of this invention to provide improved control of the motion between the probe of a refueling airborne vehicle and an airborne vehicle being refueled;

Other objects of the invention will become apparent in view of the following description taken in connection with the accompanying drawings.

DESCRIPTION OF THE DRAWINGS

FIG. 5 is a side elevational view of a collapsible paradrogue used in the first embodiment;

FIG. 6 is a side elevational view, partially in cross section of the probe tip of the first embodiment retracted before engagement with the paradrogue;

FIG. 7 is a side elevational view, partially in cross section of the probe tip of the first embodiment in its extended position when engaged with the drogue;

FIG. 8 is a side perspective view of a second embodiment of the invention;

FIG. 8A is a top plan view of the second embodiment;

FIG. 8B is a top perspective view of the refueling receptacle and VisNav sensor of the embodiment of FIG. 8.

DETAILED DESCRIPTION OF THE INVENTION

Figure 1:
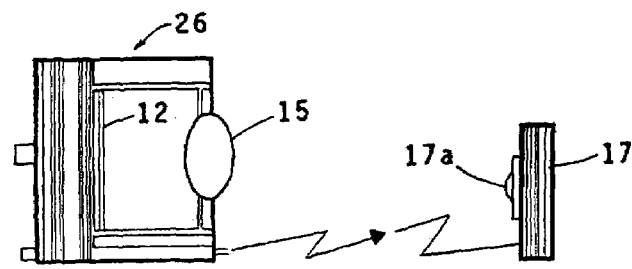
FIG. 1 is a schematic drawing illustration of a prior art aerial hookup for a aircraft refueling system.
Figure 2:
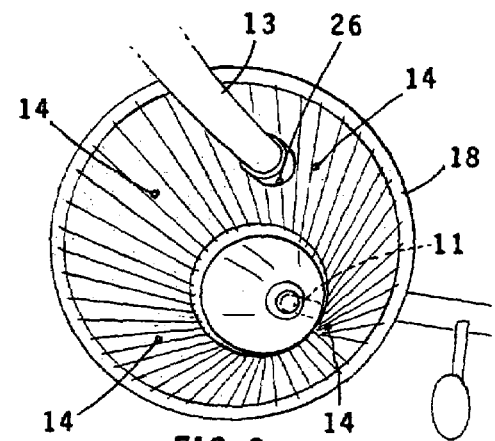
FIG. 2 is a front perspective view of a prior art probe and drogue aerial refueling system.
Figure 3:
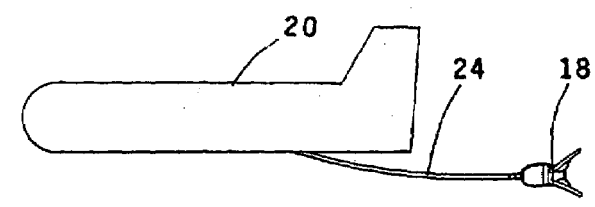
FIG. 3 is a schematic drawing of a first embodiment of the invention suitable for use refueling small air vehicles.
Figure 3:
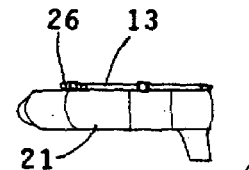
Figure 4:
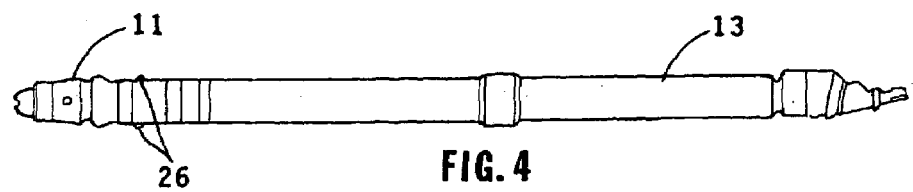
FIG. 4 is a side elevational view of a retractable probe utilized in the first embodiment.

Referring to FIGS. 1 and 2, a precision navigation system of the prior art employing a Paradrogue on the end of the boom of a refueling aircraft and a probe on the aircraft being refueled are illustrated. This prior art navigation system is known as VisNav and is illustrated in FIG. 1 and described in U.S. Pat. No. 6,266,142 issued to Junkins, et al on Jul. 24, 2001. This precision navigation system functions to determine the relative position between the probe 13 of the vehicle being refueled and the paradrogue 18 of the refueling vehicle. The VisNav optical sensor 26 is mounted on the end of the probe 13 of the vehicle being refueled. As shown in FIG. 1, the optical sensor has a position sensor 12 positioned in the focal plane of the photo detector of the sensor which measures the centroid location of the structured light focused on the detector by fisheye lens 15 from one of several (at least 4) beacons 14 on the paradrogue. Beacons 14 are modulated with a known waveform (e.g. a sine wave at a frequency of 40,000 cps) such that a matched filter in the VisNav sensor will reject ambient energy which is not at the frequency of the beacons.

A radio communications system 17 communicates with omni-directional light source 17a and adjusts its light output which is received by the beacons to control the beacon outputs. In this manner, the energy received from each beacon is optimized to provide a maximum signal to noise ratio for each line of sight measurement. This feature combined with the fisheye optics provided by lens 15 assures that the range between the vehicle being refueled and the refueling vehicle can vary widely while still maintaining the received optical energy focused on the position sensor 12 with an optimum signal to noise ratio. A navigation algorithm is utilized in the line of sight measurements to determine the x, y, and z linear displacements of the center of the paradrogue 18 (a target point in the micro-coupling system) relative to a coordinate system fixed in the fuel receiving vehicle. Further, output from the navigation algorithm are the roll (phi), pitch (theta), and yaw (psi) angles which give the angular displacement between the axis of the vehicle being refueled from its target position fixed in the Para drogue.

Referring now to FIGS. 3–7, the micro-probe and micro-adapter coupling of a first embodiment of the invention for use in airborne and ground vehicles are illustrated. The micro-probe 13 is shown retracted in FIGS. 3 and 6 and in an extended position in FIG. 7. Paradrogue or "docking captive device" 18 into which the micro-probe 13 is installed and which connects to the fueling hose 24 is illustrated in FIG. 5. The position and orientation errors (x, y, z, phi, theta, and psi) and their rates are determined by the VisNav measurements detected by VisNav sensors 26 on probe 13 and the navigation algorithm. These signals are used by the control system on the vehicle being refueled to drive the position and orientation errors towards zero at a rate consistent with safe operations. When these errors are near zero, the probe 13 drives spring 28 to the extended position as shown in FIG. 7 from it's at rest position as shown in FIG. 6, which in turn drives the coupling mechanism which triggers locks onto the collar 16 of the probe and initiates fuel flow. The fuel flow causes the clamp force to greatly increase to ensure a tight coupling of the probe to the fuel coupling mechanism.

More specifically, referring to FIG. 5, as the micro-probe 13 enters the adapter 30 of Paradrogue or "docking captive device" 18, the probe tip 13a encounters a soft spring loaded device 31 and initiates depression of the spring. At a critical level of depression, fuel flow initiates the locking of the adapter onto the probe, to ensure tight coupling. The fuel tank of the vehicle being refueled fills and is equipped with a fuel gauge. Upon approaching completion of the fueling operation, the fuel gauge triggers telemetry to provide a signal to a receiver in the fueling vehicle that causes shut down of the fuel pump. Upon shutdown, the reduced pressure permits the clamp on adapter 30 to release and allows the probe to be withdrawn from the paradrogue with near zero force on the probe. As a consequence, the control system of the vehicle being refueled can decelerate this vehicle and rapidly withdraw the probe from the coupling mechanism and paradrogue of the refueling vehicle. During withdrawal, the VisNav system measures the relative motion so that the controller can employ the measured position relative to the paradrogue to avoid collision of the probe with the paradrogue. Paradrogue deployment before refueling and retrieval after completion of refueling follows well established patterns and can be commanded by controllers in either the refueling vehicle or the vehicle being refueled.

It is to be noted that a system other than VisNav could be used to measure the position of the paradrogue relative to the vehicle being refueled. Instead of centroiding optical energy from a light emitting diode, microwave energy from suitable emitters and an appropriate microwave detector system for detecting this energy can be employed. Such a microwave system can use the same basic operation system as VisNav except for the details of the energy beacons and the detector which centroids this energy. Another alternative would be to employ digital camera technology. The beacon energy can be adjusted to optimize the centroiding accuracy of each beacon image on the detector. Pattern recognition can be employed to identify the measured images. Due to limitations of frame rate, (typically less than 200 Hz), such an embodiment will not be able to make use of high frequency modulation (e.g. 40 KHz) of the beacon energy as in the embodiments previously described.

Referring now to FIGS. 8, 8A, and 8B, a second embodiment of the invention is illustrated. The VisNav sensor 26 is positioned in the air vehicle being refueled 21 adjacent to the universal aerial refuel receptacle slipway installation (UARRSI), 33, as shown in FIG. 8. The VisNav "Smart-Lites" 14 are mounted on the refueling vehicle on the underside of both horizontal tails, the underside of the fuselage and tail cone and the refueling boom 13. In operation, the VisNav sensor 26 mounted on the vehicle being refueled 21 detects the SmartLite transmissions and a navigation solution is calculated such that the vehicle being refueled is controlled to connect with the boom 13 and receive the transfer of fuel as in the previous embodiments. However, the beacon energy can be adjusted to optimize the centroidal accuracy of each beacon image on the detector. Pattern recognition is required to identify the measured images.

Figure 9A:
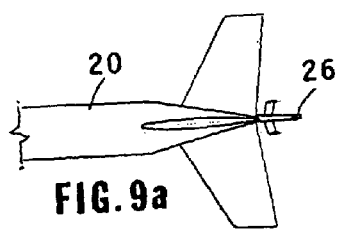
FIG. 9A is a top plan view of the refueling aircraft of the third embodiment.
Figure 9B:
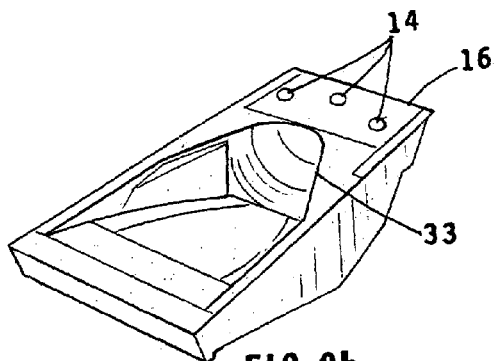
FIG. 9B is a top perspective view of the refuel receptacle of the third embodiment.
Figure 9:
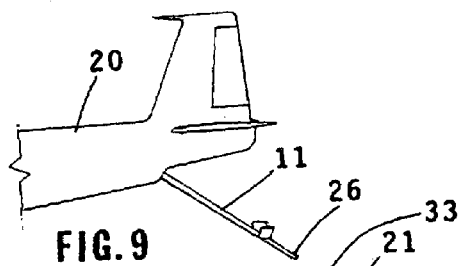
FIG. 9 is a side elevational view of a third embodiment of the invention.

Referring now to FIGS. 9, 9A, AND 9b, a further embodiment of the invention is illustrated. This embodiment is similar to the embodiment of FIG. 8 except that the SmartLite Beacons 14 are mounted on the vehicle being refueled 21 and the VisNav sensors 26 are mounted on the refueling vehicle 20 and the tip of the refueling boom. Operation is basically the same as for the previous embodiment.

Referring no to FIGS. 10–14, a further embodiment of the invention which employs a unique triangular shaped hinged boom/receptacle deployed from the refueling aircraft is illustrated. This is a unique low speed lightweight boom and Paradrogue ("docking captive device") system capable of operating from zero air speed with hovering vehicles up to and in excess of 200 knots. The fly catcher Paradrogue 18 of this embodiment is similar to that of the previous embodiments except that it is rigid. Further, unlike conventional systems, the boom remains stationary while the aircraft on which the probe is mounted flies the probe into the boom.

Figure 10:
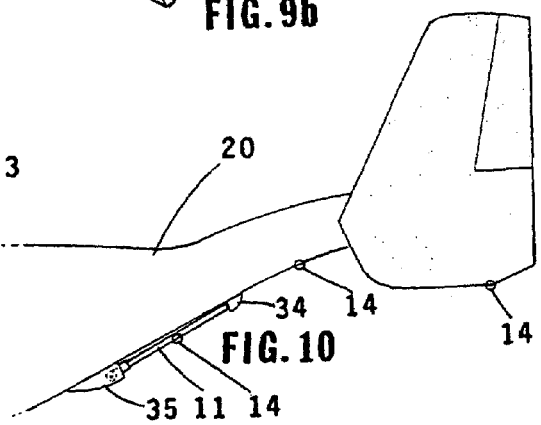
FIG. 10 is a side elevational view of a fourth embodiment of the invention having a mechanism for deploying the boom from the refueling aircraft.
Figures 11, 12:
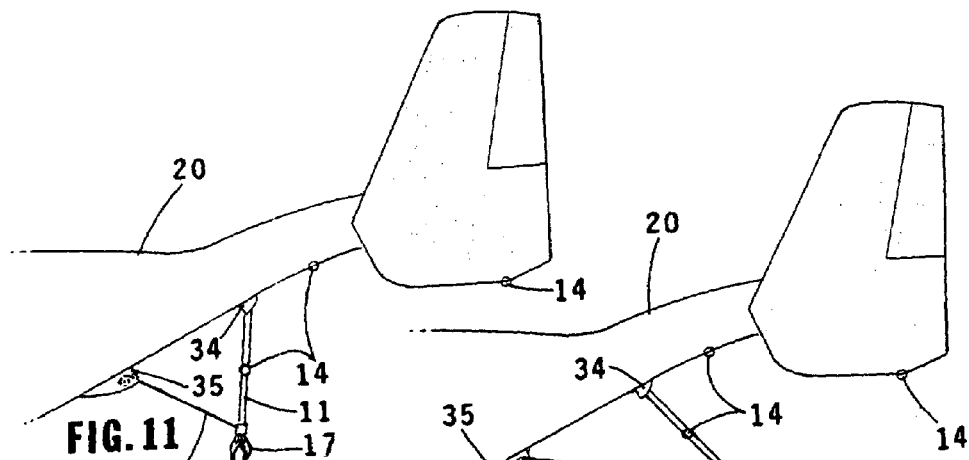
FIG. 11 is a side elevational view drawing of the fourth embodiment showing the boom partially deployed from the refueling aircraft.
FIG. 12 is a schematic drawing of the fourth embodiment showing the boom fully deployed from the refueling aircraft.
Figure 11A:
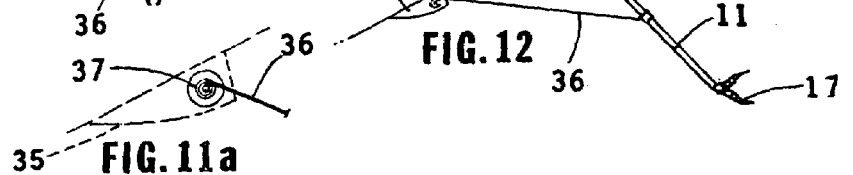
FIG. 11A is a schematic drawing illustrating the cable/reel assembly of the fourth embodiment.

The boom 11 is shown in its stowed position in FIG. 10. The inner end of the boom is connected to the body of the refueling aircraft by means of a universal coupling joint 34 and its outer end retained to the aircraft body in receptacle 35. In FIG. 11, the boom is shown partially extended from receptacle 35 on cable 36 which extends from a tensioned reel 37 mounted within the receptacle as shown in FIG. 11A. The boom is shown fully extended in FIG. 12.

The coupling joint 34 permits compliance of the cable/reel mechanism so that lateral movement caused by forces between the air vehicle boom tip and the receptacle is absorbed by the slider joint and the tensioned reel mechanism to take up slack in the cable with low force. The compliant hinge coupled with the triangular boom take up mechanism allows small interaction forces and yet restrains relative motion during refueling.

Figure 13A:
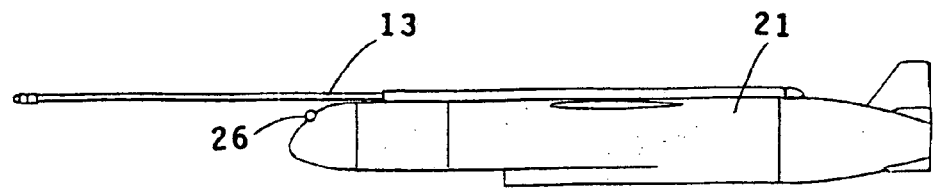
FIG. 13a is a side elevational view of the fourth embodiment of the invention, with the probe extended.
Figure 13B:
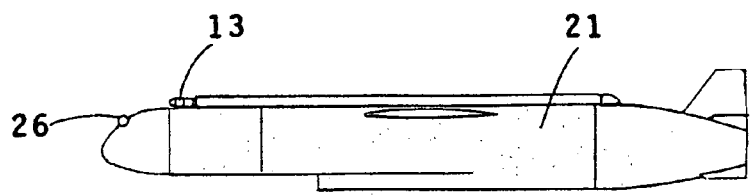
FIG. 13b is a side elevational view of the fourth embodiment of the invention, with the probe retracted.
Figure 14:
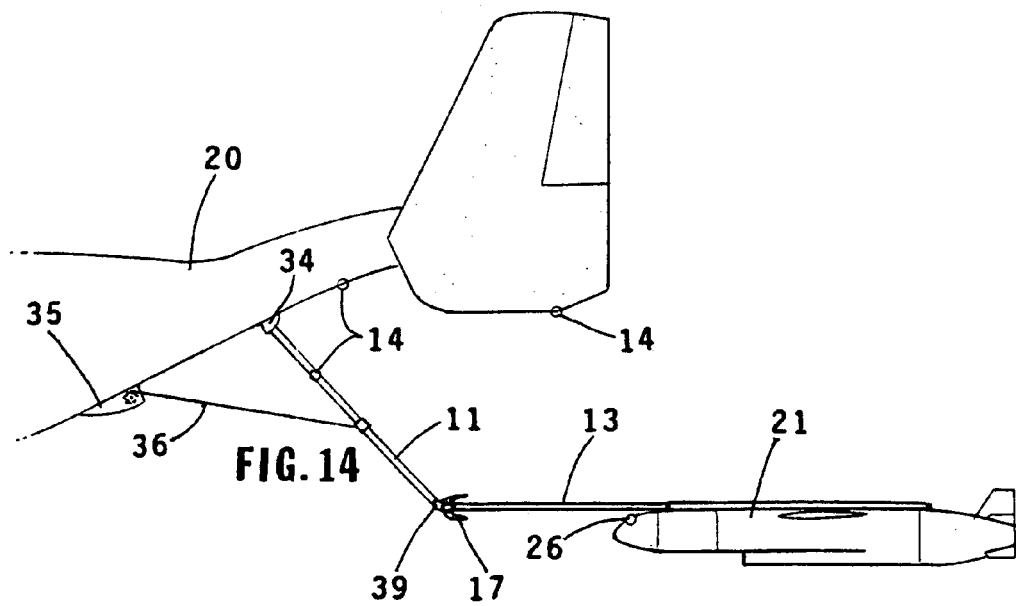
FIG. 14 is a side elevational view showing the fourth embodiment with its refueling probe connected to the drogue of the refueling aircraft.

FIG. 14 shows the refueling aircraft 20 connected to the aircraft being refueled 21 while FIGS. 13a and 13b show the refueling probe 13 of the vehicle to be refueled in its extended and retracted positions respectively. The receptacle 39 on the refueling aircraft 20 for receiving the probe 11 of the aircraft being refueled 21 has a compliant universal hinge with a resistive movement that is 50 percent or less of the yield movement of the boom. This compliant joint together with the triangular boom take up mechanisms allows small interaction forces and yet restrains relative motion during the fueling operation. It is to be noted that the Smartlife beacons 14 on the refueling aircraft and boom 11 enable the VisNav sensor 26 on the aircraft being refueled to solve the approach navigation problem and maintain control of rotating relative position during refueling.

Referring to FIG. 11, initial deployment of the boom 11 from the refueling aircraft is shown. The boom is held in this position by cable 36 attached thereto at one end and wound on spring actuated reel 37 mounted within receptacle 35. The boom is formed in telescoping sections which are spring loaded towards the retracted position. When activated by the control system, the boom is extended as shown in FIG. 12. The boom is firmly held in this position by cable 36 so that it cannot swing back and forth. As shown in FIG. 14, the boom 11 of the refueling aircraft is hooked up to the probe 13 of the aircraft being refueled. While the boom is hooked to the probe, load sensors are employed which generate signals to adjust the winch controlled cable reel 37 to minimize the load on the probe.

The universal joint of the cable/reel mechanism 37 on the refueling aircraft permits compliance of the system so that lateral movement caused by forces between the tip of the boom of the boom of the aircraft being refueled and the receptacle is absorbed by the triangular deployment slider joint and the tensioned reel mechanism which takes up slack in the cable. This results in low forces on the components of the system. Also, the compliant hinge 39 on the receptacle of the boom has a relatively low resistive moment which coupled with the triangular configuration results in small interactive forces and yet effectively restrains relative motion during refueling.

The triangle boom is a unique lightweight boom and drogue system capable of operating from zero airspeed, and therefore also useful for hovering air vehicles, up to and in excess of 200 knots, making it useful for all weight and size classes of unmanned and manned air vehicles. As pointed out above, it consists of a rigid retractable boom attached to the tanker aircraft by a universal fuel coupling joint.

The clam mechanism Paradrogue of this embodiment is similar to that of the previous embodiment except that it is rigid and can employ winglets for aerodynamic stabilization of its motions. Unlike conventional booms, in this embodiment the boom remains stationary while the aircraft with the probe flies itself into the boom. FIG. 10 shows the boom and Smartlife beacons mounted on the empennage of the tanker vehicle. Smartlife beacons are also mounted on the deployed boom. Together, all of these Smartlife beacons on he tanker aircraft permit the VisNav sensor to solve the approach navigation problem and maintain knowledge of rotating positions during the entire refueling operation.

The deployment sequence is shown in FIGS. 11 and 12. The initial boom deployment, shown in FIG. 11, is accomplished by aerodynamic loads or by using an active hydraulic actuator for very low speeds and hover. As the boom is deployed, Smartlife beacons on the shaft of the boom activate. FIG. 12 shows the boom telescoping to its full extended configuration. FIGS. 13a and 13b show a typical receiver air vehicle equipped with the VisNav sensor and a microprobe. The VisNav sensor mounted on the nose of the nose of the receiver air vehicle receives emissions from the Smartlife beacons on the tanker to compute the navigation solution during a refueling operation. The microprobe is shown in the retracted position in FIG. 13b and the extended position in FIG. 13a. FIG. 14 shows the final portion of the refueling procedure with the receiver air vehicle mated to the boom.

While hooked up, the boom will track receiver movement within limits using load sensors to adjust the cable (controlled by a winch in the tanker aircraft and a hydraulic actuator to minimize loads on the probe). The universal joint of the cable/reel mechanism on the tanker aircraft permits compliance so that lateral movement, caused by forces between the receiver aircraft boom tip and the receptacle, is absorbed by the triangular deployment boom slider joint and the tensioned reel mechanism, In this manner, slack is taken up in the cable with low forces. Also the receptacle has a compliant hinge 39 (FIG. 14) that has a resistive moment that is 50% or less of the yield movement of the boom. This compliant joint, together with the triangular boom take up mechanism allows small interaction forces but yet restrains the relative movement during refueling operations.

Figure 15:
FIG. 15 is a side elevational view of a "docking captive" system with a VisNav sensor on an aircraft and VisNav beacons mounted on a ground vehicle.

Referring to FIG. 15, the device of the invention is shown as incorporated in a "docking capture" with a VisNav sensor on an aircraft and VisNav beacons on a "flycatcher" on a ground vehicle.

As can be seen, the airborne vehicle 52 has a VisNav sensor 46 and a docking probe 47. Ground vehicle 50 has stand 51 mounted thereon. VisNav beacons 53 and flycatcher micro adaptive coupler 54 are mounted on top of the stand. Beacons 53 communicate with VisNav sensors 46 to enable control of the airborne vehicle 52 to bring the docking probe 47 into engagement with flycatcher micro adaptive coupling 54, with the docking probe maintained in such engagement.

Thus, the device of the invention provides precise motion measurements in bringing the probe or boom of the aircraft being refueled into the drogue of the refueling aircraft and to maintain proper retention during refueling. This end result is achieved by means of beacons on one of the aircraft which are operated at a pre-selected frequency and which are activated by and operate in conjunction with a VisNav sensor.

We claim:

1. In a system for joining a first vehicle to a second vehicle, said system including a probe mounted on said first vehicle and a paradrogue mounted on said second vehicle, said probe being connected to said paradrogue for connecting said first vehicle to said second vehicle comprising:
   means for generating a beam mounted on one of said vehicles;
   means for detecting said beam mounted on the other of said vehicles and measuring the relative motion between the probe and the paradrogue;
   first means responsive to said detecting means for controlling the relative motion between said probe and said paradrogue; and
   second means for controlling the relative motion between the probe and the paradrogue when the probe is within the paradrogue to restrain relative motion therebetween comprising a cable connected to said probe on one end thereof and a reel mounted on said first vehicle, the other end of said cable being connected to said reel, and means for rotatable urging said wheel to tightly wind said cable there around, said cable and said probe forming a triangular configuration with the body of said aircraft.

2. The system of claim 1 wherein said one of said vehicles comprises said first vehicle.

3. The system of claim 1 wherein said one of said vehicles comprises said second vehicle.

4. The system of claim 1 wherein said beam is an optical beam, and the means for detecting said beam is an optical sensor.

5. The system of claim 1 wherein said second vehicle is a ground vehicle and said first vehicle is airborne.

6. The system of claim 1 wherein said probe is mounted on said first vehicle on a universal mount.

7. A system for refueling a first airborne vehicle form a second airborne vehicle, said system including a probe mounted on said first vehicle and a boom mounted on said second vehicle, said boom having a paradrogue mounted on the end thereof, said probe being connected to said paradrogue, fuel being fed from said second vehicle to said first vehicle from said boom to said probe comprising:
   at least one beacon mounted on one of said vehicles for generating an optical beam;
   a detector mounted on the other of said vehicles for measuring the relative motion between said probe and said boom;
   a control system for controlling the relative motion between said boom and said probe in response to the output of said detector; and
   a mechanism for controlling the relative motion between the probe and the paradrogue when the probe is within the paradrogue including a cable having one end connected to said boom near one end of said boom, and a reel mounted on said second vehicle, the other end of said cable being connected to said reel, and means for rotatably driving said reel so as to tightly wind said cable there around, the boom and the body of said second vehicle having a triangular configuration.

* * * * *